United States Patent [19]

Scholl et al.

[11] 3,795,285
[45] Mar. 5, 1974

[54] STEERING SYSTEM FOR ARTICULATED VEHICLES

[75] Inventors: Rolland D. Scholl, Peoria; Edward J. Moyer, Morton; Terry W. Glynn, East Peoria; Richard E. Klein, Champaign, all of Ill.

[73] Assignee: Caterpillar Tractor Co., Peoria, Ill.

[22] Filed: Apr. 3, 1972

[21] Appl. No.: 240,588

[52] U.S. Cl............. 180/79.2 B, 180/103, 307/66, 318/621
[51] Int. Cl............................ B62d 5/04, B62d 5/06
[58] Field of Search..........180/79.1, 79.2 R, 79.2 B, 180/82 R, 103; 114/144 R; 307/48, 66; 318/587, 621, 663, 674; 340/249

[56] References Cited
UNITED STATES PATENTS

| | | | |
|---|---|---|---|
| 3,455,408 | 7/1969 | Larsen........................... | 180/79.2 B |
| 3,007,655 | 11/1961 | Criswell et al................. | 180/79.1 X |
| 3,465,276 | 9/1969 | Silva et al....................... | 318/621 X |
| 3,440,435 | 4/1969 | Sanders........................... | 307/66 |
| 3,387,684 | 6/1968 | Belke et al....................... | 180/79.1 X |
| 3,662,243 | 5/1972 | Cavil et al....................... | 318/674 X |
| 2,496,391 | 2/1950 | Hall................................ | 318/621 X |
| 2,729,750 | 1/1956 | Draper et al..................... | 307/66 X |
| 3,577,003 | 5/1971 | Behr et al........................ | 307/66 |

Primary Examiner—Kenneth H. Betts
Assistant Examiner—Leslie J. Paperner
Attorney, Agent, or Firm—Fryer, Tjensvold, Phillips & Lempio

[57] ABSTRACT

The front frame of an articulated vehicle is pivoted relative to the back frame for steering purposes by fluid motors controlled through an electrically operated valve. The valve is controlled by the output of an amplifier which produces a signal indicative of the difference between a command signal obtained from a potentiometer coupled to the operator's steering wheel and an actual articulation signal from another potentiometer responsive to changes in the angle of the vehicle frames. Thus a difference between the position of the steering wheel and the actual articulation of the vehicle results in operations of the fluid motors to eliminate such difference. A phase lag is provided in the feedback loop defined by the system to counteract the effects of oil mass resonance which otherwise causes instability unless steps are taken that have adverse side effects such as slowing response and decreasing precision in fluid motor operated systems. Safety means are provided for maintaining electrical energization in the event of failure of the primary power supply and for blocking starting of the vehicle engine if steering wheel position does not conform with actual articulation.

7 Claims, 8 Drawing Figures

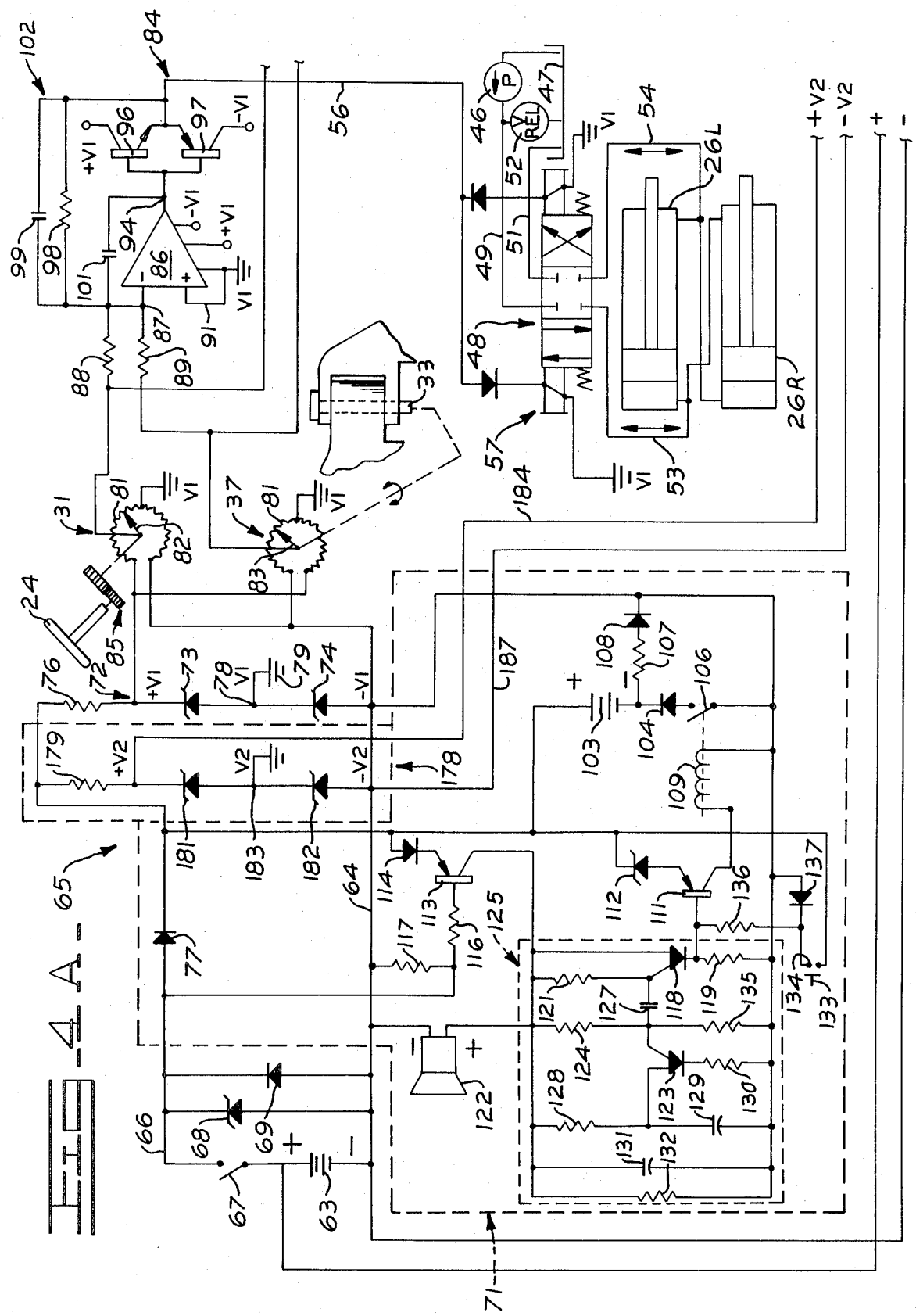

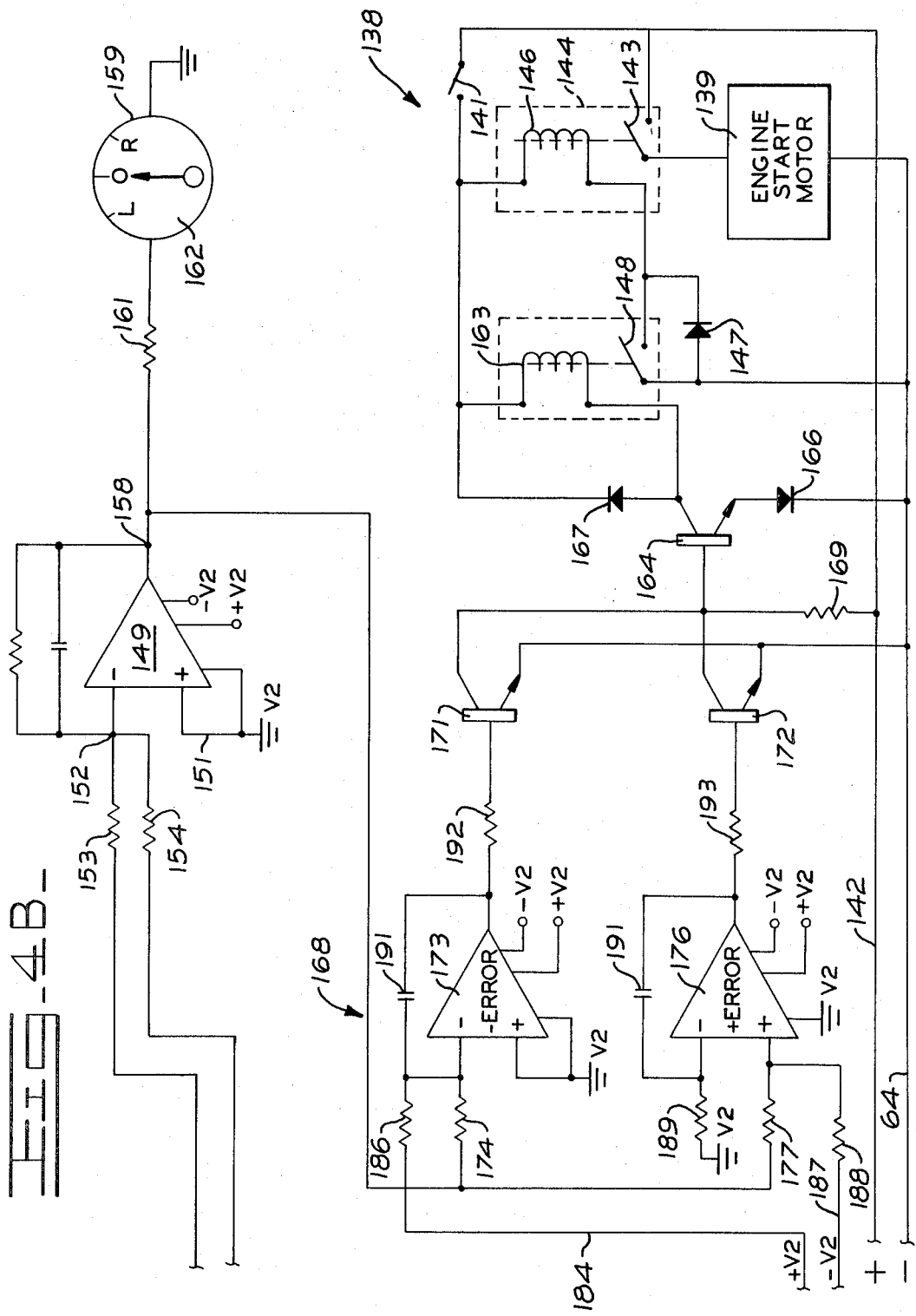
FIG_4B_

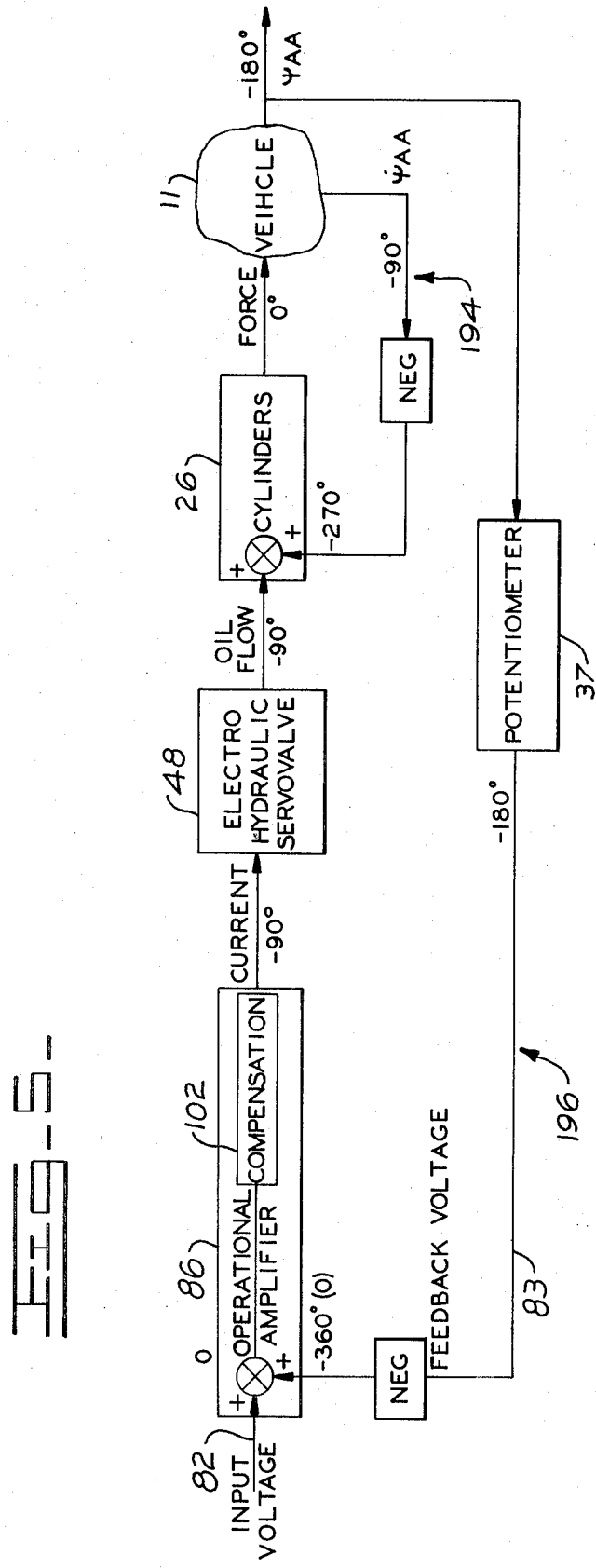

NOT COMPENSATED

COMPENSATED ered position. To stop articulation at the desired point, the operator has to return the steering wheel to the center position at the proper time in order to close the flow valve and stop articulation of the vehicle at the desired turning angle. While such systems have been employed, there is a loss of operator efficiency and safety in that the necessary movements of the steering wheel are difficult and are not those to which most persons are accustomed. Mechanical follow-up mechanisms, such as disclosed in U.S. Pat. No. 3,444,948 for example, add substantially to the bulk and cost of articulated vehicle steering systems.

STEERING SYSTEM FOR ARTICULATED VEHICLES

BACKGROUND OF THE INVENTION

This invention relates to articulated vehicles and more particularly to steering systems therefor.

Articulated vehicles have a jointed body whereby one portion may be pivoted relative to the other about a vertical axis. Steering is provided for by fluid motors interconnected between the front and rear portions of the body to force articulation about the pivot axis in response to movement of the operator's steering wheel or the like.

Relative to the Ackermann steered vehicles, such as most automobiles, articulated vehicles are widely recognized as having superior mobility, manueverability, and tractive power, particularly on adverse terrain. However, the steering system of articulated vehicles is more complex and costly, basically because relatively large forces are necessary to move the inertial mass of a sizable portion of the vehicle. Prior articulated vehicle steering systems are further subject to an undesirable slowness of response and a lack of precision in following the motion of the operator's steering wheel or the like.

These problems have become more acute with the advent of very large articulated trucks, tractors, and the like and in view of a tendency to operate articulated vehicles at higher speeds.

Because very large forces are required for steering, articulated vehicles have customarily utilized hydraulic steering cylinders for forcing angling of one portion of the vehicle relative to the other in response to movement of the operator's steering control. Control of the hydraulic cylinders requires a high capacity flow valve between the cylinders and a source of high pressure fluid which is generally driven by the vehicle engine. The valve has customarily been controlled through mechanical linkage and gears or hydraulic means which connect with the operator's steering wheel or the like.

This system of linkage and gears or hydraulic elements is necessarily extensive and complex and is usually further complicated by mechanism for providing a follow-up action.

The follow-up mechanism is essentially a feedback loop which causes the vehicle to stop articulating when rotation of the steering wheel itself stops so that the operator may manipulate his steering wheel as he would in an Ackermann system as employed in automobiles and the like. In the absence of a follow-up action, vehicle articulation continues to the limit of cylinder movement as long as the steering wheel is away from the centered position. To stop articulation at the desired point, the operator has to return the steering wheel to the center position at the proper time in order to close the flow valve and stop articulation of the vehicle at the desired turning angle. While such systems have been employed, there is a loss of operator efficiency and safety in that the necessary movements of the steering wheel are difficult and are not those to which most persons are accustomed. Mechanical follow-up mechanisms, such as disclosed in U.S. Pat. No. 3,444,948 for example, add substantially to the bulk and cost of articulated vehicle steering systems.

A further very serious problem can occur in prior articulated vehicle steering systems as a result of a phenomenom known as "oil mass resonance." In practice, the oil or the like which applies force to the vehicle mass through the hydraulic cylinders exhibits what amounts to a degree of compressibility. Aside from trapped or dissolved gases, the major causative factor is usually the elasticity of the hoses which transmit fluid to the cylinders and to some extent the resiliancy of other surfaces exposed to the fluid pressure. Given some effective compressibility of oil which is moving a large mass, and given the inherent positive feedback through cylinder volume change from articulation motion, it may be seen that the system is capable of oscillation in a manner analogous to a spring acting on a mass and that a given system will have a specific resonant frequency. As will hereinafter be discussed in more detail, the practical result of this oil mass resonance on articulated vehicle steering systems has been to cause cyclic variations in the rate of vehicle articulation relative to the rate theoretically established by motion of the steering wheel. This slows response of the vehicle to the steering wheel, decreases precision and accuracy in the turning movement, and limits the gain and band width of the system viewed as a power amplifier. While the adverse effects of oil mass resonance have been heretofore recognized in connection with hydraulic circuits, in general, such corrective measures as have been applied have been dissipative of energy and variously result in deteriorated steady state performance, excess component wear, heat generation and undesirably large fluid supply capacity requirements. Such techniques, for example, include the providing of back lash, providing for leakage oil flow from one end of the cylinder to the other, and the deliberate introduction of friction or other energy absorbing means.

SUMMARY OF THE INVENTION

This invention is a steering system for articulated vehicles in which the interconnection between the operator's steering wheel or the like and the fluid motor control valve is by means of an electrical circuit which may provide a follow-up action to simulate the characteristics of an Ackermann steering system and which may include efficient means for alleviating the undersirable effects of oil mass resonance.

In a preferred form, means are provided whereby turning of the steering wheel or the like produces an electrical signal indicative of the desired articulation of the vehicle. A second electrical signal indicative of the actual articulation of the vehicle is generated by other means. The two signals are compared and an electrically controlled valve responds to any difference by energizing fluid motors to eliminate the difference. The effects of oil mass resonance may readily be alleviated by providing a phase lag in the fluid motor control signal path whereby the total feedback in the system as a whole is made negative and therefore cancels out oscillation.

Also in a preferred form, reliability and safety of the vehicle is increased by means which continue steering system operation in the event of failure of the vehicle electrical power source and by means which prevent starting of the vehicle engine until such time as steering wheel position is brought into substantial conformity with the actual articulation of the vehicle at the time of start up.

Accordingly, it is an object of this invention to provide a compact and economical steering system for an articulated vehicle which has fast response, high precision, and which is reliable and safe.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 4A is a schematic diagram of electrical and hydraulic circuits of the steering system of the vehicle of FIGS. 1 to 3, FIG. 4B is a schematic diagram, which may be juxtaposed end to end with FIG. 4A to form a single continuous diagram, showing additional electrical circuitry for increasing safety and reliability of the system, FIG. 5 is a simplified block diagram of the steering system illustrating feedback paths and phase relationships therein.

DESCRIPTION OF A PREFERRED EMBODIMENT

Figure 1:
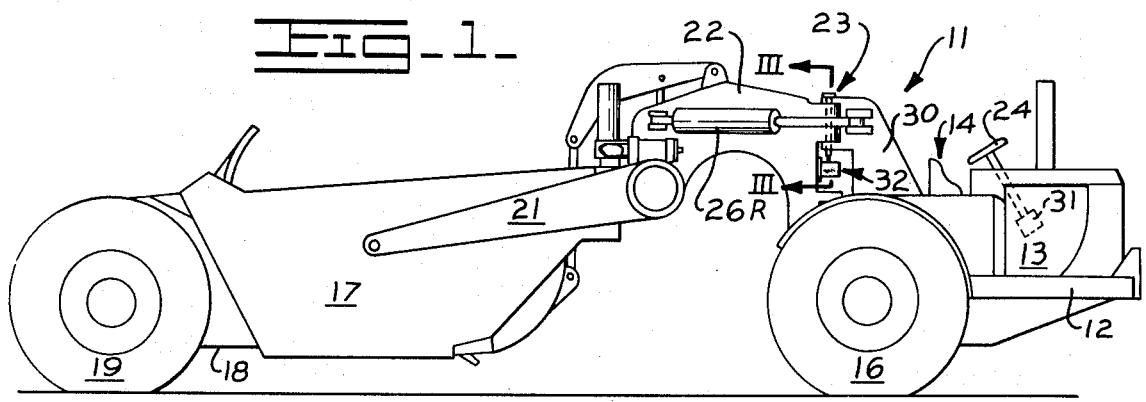
FIG. 1 is a side elevation view of a typical articulated vehicle provided with a steering system in accordance with the present invention, the vehicle in this example being a tractor scraper of the kind used in earthmoving operations.
Figure 2:
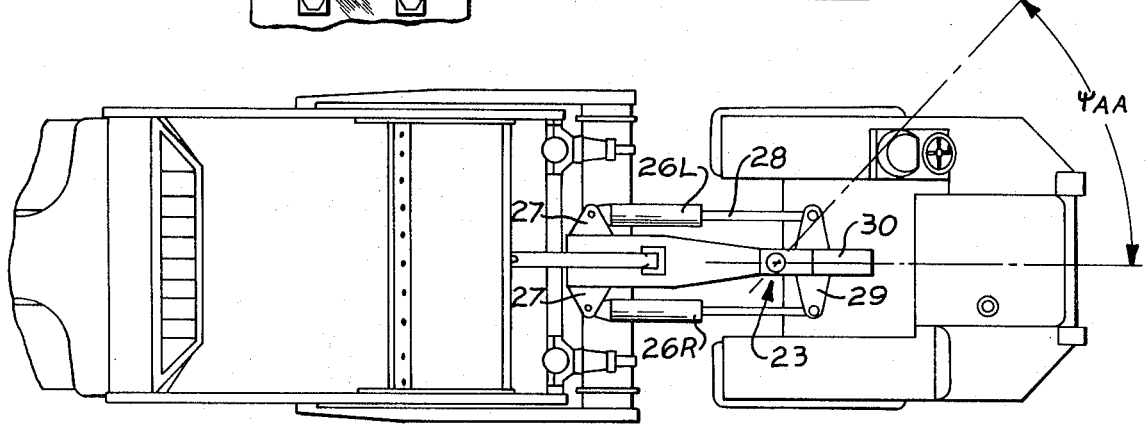
FIG. 2 is a plan view of the forward portion of the vehicle depicted in FIG. 1.

Referring initially to FIGS. 1 and 2 of the drawings in conjunction, a scraper 11 is shown as one example of an articulated vehicle with which the present invention may be employed. It should be understood that the invention is equally applicable to articulated trucks, tractors and diverse other forms of articulated vehicle, reference to a scraper being made herein simply for purposes of example.

Salient components of a scraper 11 of this form include a tractor unit 12 having an engine 13 and operator's station 14 riding on front wheels 16 and constituting the front section of the vehicle. The rear section of the vehicle is defined by a bowl 17 supported at the back end by a frame 18 riding on rear wheels 19. The front end of bowl 17 is supported by draft arms 21 connecting with a gooseneck 22 which is joined to the tractor unit 12 at a pivot hitch 23 that defines the articulation axis of the vehicle. Steering of the scraper 11 is accomplished by articulating the vehicle about the axis of pivot hitch 23 in response to turning of the operator's steering wheel 24 or manipulation of an equivalent control.

To force articulation, hydraulic steering cylinders including a right cylinder 26R and left cylinder 26L extend along the right and left sides respectively of gooseneck 22. Each such cylinder 26 has a head end pivoted to an associated one of a pair of rear brackets 27 which extend sidewardly from the rear portion of the gooseneck and has extensable and retractable rod 28 pivotably coupled to an associated one of a pair of forward brackets 29 which extend sidewardly from a post 30 of the tractor unit 12 that connects with pivot hitch 23. Accordingly, the front section of the vehicle may be caused to assume a desired angle relative to the rear section by extending one of the cylinders 26 while contracting the other.

To provide for appropriate actuation of the jacks 26 in response to turning of the steering wheel 24, the steering wheel is coupled to a command signal potentiometer 31 which will be hereinafter discussed in more detail in connection with the electrical circuit of the system. The steering system also requires an actual articulation signal for reasons to be hereinafter discussed in detail. For this purpose, an articulation signal potentiometer assembly 32 is coupled to pivot hitch 23.

Figure 3:
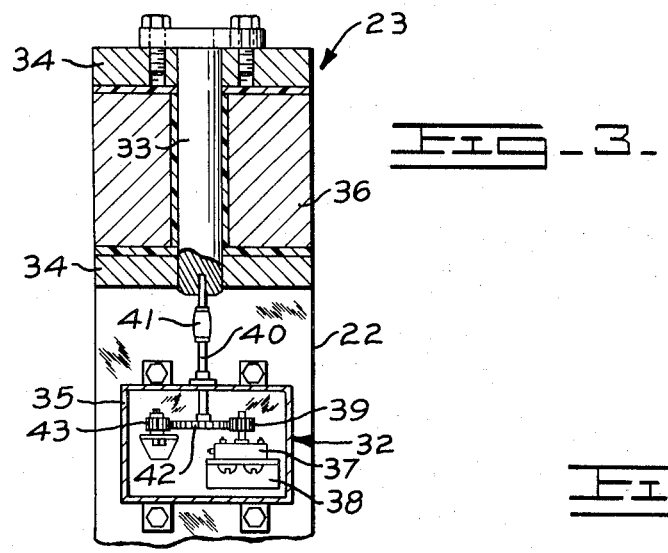
FIG. 3 is an elevation section view taken along line III—III of FIG. 1 showing signal generating mechanism situated at the articulation axis of the vehicle thereof.

More specifically, with reference to FIGS. 1 and 3 in combination, the pivot hitch 23 is defined in part by a pivot pin 33 transpierced through a pair of vertically spaced members 34 extending from post 30 of the front section of the vehicle and through an intervening sleeve portion 36 at the forward end of the gooseneck 22. Pin 33 is secured to the upper member 34 and thus turns as the front section of the vehicle is angled relative to the back section. An articulation signal potentiometer housing 35 is secured to the gooseneck 22 below pin 33 and a potentiometer 37, which is of the rotary form, is mounted within housing 35 on a bracket 38. A gear wheel 39 is secured on the rotatable shaft of the potentiometer and a small shaft 40 is coupled to the lower end of pivot pin 33 through a radially flexible but torsionally rigid coupling 41 and extends along the rotary axis of the pin into housing 35 where a gear wheel 42 is mounted coaxially on the end of the shaft 40 and engaged with potentiometer gear wheel 39. An additional idler gear 43 within housing 35 engages gear 42 to hold the gear 42 in engagement with gear 39. Accordingly, any rotation of the front section of the vehicle relative to the back section acts through shaft 41 and gears 42 and 39 to produce a corresponding change in the setting of potentiometer 37, the electrical connections to the potentiometer being hereinafter described. Gear 42 is preferably of larger diameter than gear 39 since most potentiometers have a range of adjustment extending for almost a full revolution while the maximum articulation of the vehicle is generally much less, typically 45° in either direction, and thus the difference in gear diameters enables the full range of adjustability of the potentiometer to be utilized.

Considering now the electrical and hydraulic circuits which cause the steering cylinders 26 to respond to the operator's manipulation of steering wheel 24, reference should be made initially to FIG. 4A. Pressurized fluid for operating the steering cylinders 26 is typically provided by a pump 46 driven by the vehicle engine. Pump 46 draws fluid from a reservoir 47 and transmits such fluid to a steering cylinder control valve 48 through a conduit 49 and a return line 51 extends between valve 48 and reservoir 47. To establish a predetermined maximum fluid pressure in the system a relief valve 52 is connected between conduit 49 and the reservoir. Control valve 48 has a pair of outlet conduits 53 and 54 communicating with the steering cylinders 26. Conduit 53 in particular communicates with the head end of cylinder 26L and the rod end of cylinder 26R and thus pressurization of this conduit causes the vehicle to articulate for a right turn. Conduit 54 communicates with the rod end of cylinder 26L and the head end of 26R and thus upon being pressurized initiates a left turn of the vehicle. Valve 48 is a three position valve spring biased to a centered or Hold position at which conduits 53 and 54 are blocked and thus the steering cylinders 26 are immobilized. Valve 48 may be shifted to a right turn position at which conduit 53 is communicated with conduit 49 while conduit 54 is communicated with drain conduit 51 and may also be shifted to a left turn position at which these conduits communications are reversed. In order that the rate of movement of the steering cylinders 26 can be conformed with that of the steering wheel 24, control valve 48 is of the variable flow passage type which may be shifted towards either of the extreme positions by any selected amount.

Valve 48 is controlled by an electrical voltage received through an input conductor 56 to electrical pilot means 57 of the form which shifts the valve towards the right turn position in response to a positive voltage in an amount dependent on the magnitude of the voltage and which similarly shifts the valve towards the left turn position in response to a negative input voltage, suitable detailed constructions for electrohydraulic servo valves of this form being well known to the art.

Thus the flow orifice to the steering cylinders 26 is controllable by varying the voltage at input conductor 56. Considering now the electrical circuit for producing the required voltage changes at valve input conductor 56 in response to turning of the operator's steering wheel 24, the control circuit 65 is operated from a suitable DC power source which may be the vehicle battery 63. The negative aide of battery 63 is connected to a B− conductor 64 while the positive side of the battery is connected with a B+ conductor 66 through an on-off switch 67 which may be closed to activate the steering circuit. A Zener diode 68 and additional diode 69 are connected in parallel between conductors 66 and 64 to eliminate voltage transients from the steering circuit.

To supply necessary operating voltages to command signal potentiometer 31 and actual articulation signal potentiometer 37, a power supply 72 is connected across conductors 66 and 64. Power supply 72 is defined by two Zener diodes 73 and 74 connected in series between B− conductor 64 and B+ conductor 66 in series with a voltage dropping resistor 76 and a diode 77 which protects the circuit against inverted voltage. As it is desired to obtain both positive and negative voltage signals from the potentiometers 31 and 37 according to the setting thereof, a junction point 78 between Zener diodes 73 and 74 is connected to a circuit ground 79 and the resistive elements 81 of both potentiometers are grounded at the center. The values of Zener diodes 73 and 74 and voltage dropping resistor 76 in this example are selected to supply a positive 3 volts to one end of the resistive element 81 of potentiometer 31 and to the opposite end of the resistive element 81 of potentiometer 37 and to supply a negative 3 volts to the other ends thereof. Accordingly, the rotary contacts 82 and 83 of potentiometers 31 and 37 respectively may each exhibit a voltage ranging from positive 3 volts to negative 3 volts according to the angular position of such contacts.

Rotary contact 82 of command signal potentiometer 31 is mechanically coupled to the vehicle steering wheel 24, through gears 85 similar to the previously described gears 39 and 42, and the movable contact 82 is positioned to receive circuit ground potential when the steering wheel is oriented for straight line travel and to receive a positive voltage when the steering wheel is turned for a left turn and a negative voltage when the steering wheel is turned for a right turn, with the magnitude of such voltages being proportional to the degree of turning of the steering wheel in either instance. The rotary contact 83 of actual articulation potentiometer 37, which is mechanically linked to the vehicle articulation pivot pin 33 as previously described, receives circuit ground potential when there is no articulation of the vehicle and receives negative voltage when the vehicle is articulated for a left turn and positive voltage when the vehicle is articulated for a right turn, such voltage again being proportional in magnitude to the degree of articulation.

Accordingly, command signal potentiometer 31 generates an electrical signal having a polarity indicative of the direction in which the operator wishes to turn the vehicle and having a magnitude indicative of the desired turning radius. Simultaneously, actual articulation potentiometer 37 generates another electrical signal indicative of the actual angling of the vehicle with respect to both direction and degree. A lack of correspondance in these two signals indicates a need to actuate the steering cylinders 26 and is detected by a circuit means 84 connected between potentiometers 31 and 37 and the electrical pilot means 57 of valve 48.

Basically, the steering system operates by detecting any difference between the magnitudes of command signal voltage from potentiometer 31 and the actual articulation signal from potentiometer 37 and by continually controlling valve 48 to eliminate any such difference. When the steering wheel 24 is stationary, the command signal voltage and the actual articulation signal voltage are matched in magnitude although of opposite polarity except when both are at circuit ground potential. Under this matched condition, circuit means 84 holds valve 48 at the centered or Hold position at which steering cylinders 26 are immobilized. When the operator turns the steering wheel 24 the command signal momentarily departs from correspondence with the actual articulations signal. This difference is detected by circuit means 84 which then actuates valve 48 to cause the actual articulation signal to move towards conformity with the command signal. Thus, the actual articulation of the vehicle about pivot pin 33 is forced to follow angular changes in the position of steering wheel 24 and the desired steering of the vehicle is realized.

For this purpose circuit means 84 includes an operational summing amplifier 86 having an inverting input 87, constituting a summing junction, which is connected to the rotary contacts 82 and 83 of the potentiometers 31 and 37 respectively through resistors 88 and 89 respectively, the positive input 91 of the operational amplifier being connected to circuit ground. As long as the command signal and the articulation signal are of equal magnitude but opposite polarity, cancelation occurs at summing junction 87 and no output is present at the output terminal 94 of operational amplifier 86. However, if the magnitude of the command signal voltage begins to deviate from that of the articulation signal as a result of turning of the steering wheel 24 an input voltage to amplifier 86 is developed at junction 87 that has a polarity indicative of the direction of the desired turn. This slight difference is amplified by amplifier 86 and is applied to the base of two transistors 96 and 97 which function as a current amplifier in order to provide sufficient power to operate the pilot means 57 of valve 48. Transistor 96 is of the NPN form and has a collector connected to the junction between resistor 76 and Zener diode 73 of power supply 72 and thus receives a positive voltage of three volts in this instance. Transistor 97 is of the PNP form and has a collector connected to B− conductor 64 and thus receives a voltage of minus three volts relative to the circuit ground. The emitters of both transistors 96 and 97 are connected together and to the input conductor 56 of valve pilot means 57. Accordingly, any error signal from the output 94 of operational amplifier 86, indicative of a momentary departure of the command signal from the articulation signal, is amplified both in voltage and current and is applied to the polarized pilot means 57 of valve 48. The steering cylinders 26 are thereby actuated as previously described causing the actual articulation of the vehicle to follow the turning of steering wheel 24.

Circuit means 84 also includes a feedback network formed by a resistor 98 and capacitor 99 connected in parallel between the emitters of transistors 96 and 97 and the inverting input to operational amplifier 86 at summing junction 87, this feedback network being additional to the stabilizing capacitance 101 associated with operational amplifiers 86 of this form. The feedback network 102 provides a deliberately introduced phase lag to remove the adverse effects of oil mass resonance as will hereinafter be discussed in detail following completion of the description of the steering circuit 65.

Dependable operation of a vehicle steering system is of extreme importance from the standpoint of safety as well as operating efficiency and it may be seen that the steering system as described to this point is dependent on the vehicle battery 63 for operating power. There is, of course, a risk that the vehicle battery 63 may become discharged or otherwise fail to maintain adequate power. To forestall any significant adverse results of such an occurance, the steering circuit 65 includes the battery failure safety circuit 71.

Circuit 71 includes a supplementary battery 103 having a positive side connected to B+ conductor 66 through diode 77 and having a negative side connected to B− conductor 64 through a diode 104 and relay contacts 106 which may be of the reed variety. The negative side of supplementary battery 103 is also connected to B− conductor 64 through a resistor 107 and additional diode 108 which provides for charging of the battery 103 at such time when the vehicle is in normal operation.

Relay contacts 106 are maintained closed, except under conditions to be hereinafter described, by energization of an associated driver coil 109 which is connected between B+ conductor 66 and B− conductor 64 in series with the emitter-collector circuit of a control transistor 111, a zener diode 112 and diode 77, the control transistor being normally biased to conduction through a base resistor 119 which connects with B− conductor 64.

Accordingly current may flow from supplementary battery 103, to assure continued operation of the system, whenever the output voltage of the vehicle battery 63 drops below that of the supplementary battery.

It is desirable that the operator be made aware of operation of the system from the supplementary battery 103 and that means be provided to prevent prolonged operation of this kind to avoid damage to the supplementary battery. Considering now means for both purposes, a drop of vehicle battery voltage sufficient to cause a drain of supplementary battery 103 power is sensed by a comparator transistor 113. Transistor 113 has an emitter connected to the cathode side of diode 77 through an additional diode 114 and has a base connected to B+ conductor 66 at the anode side of diode 77 through a base resistor 116 and which is further connected to B− conductor 64 through the base resistor 116 and an additional resistor 117. Accordingly, when the output potential of vehicle battery 63 drops below that of supplementary battery 103, comparator transistor 113 is biased into conduction.

To alert the operator of this condition so that corrective measures may be taken, an audible horn 122 or other indicator means is connected between the collector of comparator transistor 113 and B− conductors 64. Thus the horn 122 sounds while the system is being operated from the supplementary battery 103.

To shut down the system after a predetermined period of operation from supplementary battery 103, conduction through comparator transistor 113 energizes a timing circuit 125. The timing circuit 126 may have a programmable uni-junction transistor 118 having an output connected to the junction between the base of transistor 111 and resistor 119 and having one input connected directly to the collector of transistor 113 while the other input connects therewith through a resistor 121. A resistor 128 and capacitor 129 are connected in series between the collector of transistor 113 and B− conductor 64 and the junction between the resistor and capacitor connects to one input of a second programmable uni-junction transistor 123 which has an output connected to B− conductor 64 through a resistor 130. The other input of PUT 123 connects to the collector of transistor 113 through a resistor 124 and to B− conductor 64 through another resistor 135 and is still further connected to the junction between PUT 118 and resistor 121 through a coupling capacitor 127.

Accordingly, both PUT 118 and PUT 123 are initially non-conducting and remain in this condition for a period after comparator transistor 113 conducts until such time as capacitor 129 has charged sufficiently to trigger PUT 123. The RC network defined by resistor 128 and capacitor 129 has a suitably large time constant to delay triggering of PUT 123 for the desired period which is twenty minutes in this example. When capacitor 129 has charged sufficiently to establish conduction through PUT 123, the resultant signal transmitted through capacitor 127 causes conduction through PUT 118 which in turn stops conduction through control transistor 111 causing relay contacts 106 to open and thereby disconnect supplementary battery 103 from operative relationship to the circuit. If the potential of vehicle battery 63 has not been restored sufficiently during the interval, the system is shut down.

To avoid energizing or de-energizing of the timing circuit 125 from momentary voltage variations, an additional capacitor 131 and resistor 132 are connected in parallel between the collector of comparator transistor 113 and B− conductor 64.

Should the vehicle engine be shutdown during a period when the supplementary battery 103 is latched into the steering circuit as described above, it is desirable that the supplementary battery 103 be immediately unlatched from the circuit so that the supplementary battery will not continue to discharge during the shutdown period. Vehicles customarily have some form of manual electrical switch 133 which is operated to shutdown the engine. The shutdown switch 133, which may have other unrelated functions known to the art, is arranged to close a set of normally open contacts 134 which are connected between B+ conductor 66 and the base of control transistor 111 in series with a resistor 136, a protective diode 137 being connected between the contacts and B— conductor 64. Actuation of the engine shutdown switch 133 thus applies positive bias to the base of transistor 111 turning off the transistor and thereby opening relay contacts 106 to unlatch the supplementary battery 103 from the circuit.

FIG. 4B illustrates still another portion of the steering circuit which avoids a safety hazard at the time the vehicle is started up. In particular, utilizing the steering circuit of the present invention it may be seen that a violent and potentially hazardous lurching of the vehicle could occur in the absense of corrective measures if the position of the steering wheel is substantially out of conformity with the actual articulation of the vehicle at the time of start up. Under this condition the steering system would rapidly change the articulation of the vehicle to conform with the position of the steering wheel and this sudden motion might not be anticipated by the operator or by bystanders. To avoid this hazard, FIG. 4B illustrates a safety start up circuit means 138 which prevents starting of the vehicle engine until such time as the position of the steering wheel is brought substantially into conformity with the actual articulation of the vehicle at that time.

The vehicle may have any of the conventional electrically actuated starting means represented in FIG. 4B by starter motor 139 which cranks the engine when voltage is applied thereto as a result of closing of a normally open starter switch 141 which may also be of conventional design. Engine starter 139 is connected between B— conductor 64 and a conductor 142 from the positive side of vehicle battery 63 through a set of normally open contacts 143 of a starting relay 144 having a driver coil 146 connected between conductors 64 and 142 in series with a protective diode 147 and the starting switch 141. The elements of the starting system as described to this point may be conventional except that the driver coil 146 of starting relay 144 is connected across power conductors 64 and 142 in series with a second set of normally open relay contacts 148 in addition to being in series with the starter switch 141. A diode 147 is connected across relay contacts 148 for purposes of arc suppression.

Accordingly, as long as relay contacts 148 remain closed, the engine may be started in the conventional manner by closing starter switch 141. However, safety start up circuit 138 functions to detect any substantial lack of correspondence between the position of the steering wheel and the actual articulation of the vehicle and opens contacts 148 in the presence of such a condition thereby preventing starting of the engine until the steering wheel is turned into substantial conformity with the actual vehicle articulation.

In order to sense the position of the steering wheel relative to the actual articulation of the vehicle for this purpose, an additional operational summing amplifier 149 is utilized which has input connections essentially similar to those of the input connections to operational amplifier 96. Specifically, positive input 151 of operational amplifier 149 is connected to circuit ground while the inverting input 152 is a summing junction connected to the movable contact 82 of command signal potentiometer 31 through a resistor 153 and also connected to the movable contact 82 of actual articulation signal potentiometer 37 through a separate resistor 154. As in the previous instance, the output 158 of operational amplifier 149 is at circuit ground when the command signal voltage and actual articulation signal voltage conform in magnitude. Any deviation of the magnitude of the command signal voltage from that of the actual articulation signal produces a potential at output 158 which has a magnitude indicative of the degree of deviation and a polarity indicative of the direction of deviation. To provide the operator with a visual indication of any deviation of the steering wheel position from the actual articulation of the vehicle, an error meter 159 is connected between the output 158 of amplifier 149 and circuit ground in series with a load resistor 161. While meter 159 may be a conventional volt meter structurally and functionally, the face 162 of the meter is preferably calibrated to include a zero point, corresponding to no voltage at the meter, indicating conformity of the steering wheel position and vehicle articulation and left and right readings, corresponding to positive and negative voltage, to inform the operator of the direction and approximate magnitude of the deviation of steering wheel position from actual articulation. The operator may then readily perceive in which direction and to what extent the steering wheel needs to be turned to bring about conformity between steering wheel position and actual articulation so that the vehicle may be started.

The circuit 138 as described to this point would in itself increase safety providing that the operator is attentive to the meter 159 before actuating the starting switch 141 and takes corrective measures to bring the meter back to the zero indication. However, for additional safety, circuit 138 further provides means which positively prevents energization of starter motor 139 until meter 159 is brought back substantially to the zero reading. Specifically, the previously described realy contacts 148 which must be closed to permit energization of the engine starting relay 144 are controlled by a driver coil 163 connected between battery power conductors 64 and 142 in series with the starter switch 141, the emitter-collector circuit of a control transistor 164 and a diode 166, an additional diode 167 being connected across the coil terminals to suppress voltage transients. Since energization of driver coil 163 closes contacts 148, the engine can be started up only if coil 163 is energized. Energization of coil 163 in turn depends on conduction through control transistor 164. Thus, a non-conductive state of transistor 164 will block starting of the engine.

Transistor 164 is controlled by an error signal measuring circuit 168 connected between the base of transistor 164 and the output 158 of amplifier 149.

A slight mismatch between the positions of the steering wheel and the actual articulation of the vehicle at start-up is not hazardous and error signal detector circuit 168 therefore is arranged to maintain transistor 164 conducting unless the mismatch exceeds some predetermined amount which may typically be plus or minus 1.5° of articulation. The gain of amplifier 149 is fixed so that the output voltage at terminal 158 will be of a known voltage when this amount of mismatch is present and error signal detector circuit 168 acts to turn off transistor 164 when the voltage at output 158 exceeds this predetermined value.

For this purpose, control transistor 164 is normally held conductive by base bias received through a resistor 169 connected to positive battery voltage conductor 142. The base of transistor 164 is also connected to B− conductor 64 through the emitter-collector circuits of two additional transistors 171 and 172. Thus, if either transistor 171 or 172 conducts, base bias is removed from transistor 164 causing relay contacts 148 to open to prevent starting of the engine. The error signal detecting circuit 168 acts to bias either transistor 171 or transistor 172 into conduction and thereby blocks starting of the engine if the output signal from amplifier 149 indicates that steering wheel position deviates from actual vehicle articulation by a predetermined amount.

For this purpose, the output 158 of amplifier 149 is connected with the inverting input of a negative error voltage detecting operational amplifier 173 through a resistor 174 and to the positive input of a positive error voltage detecting operational amplifier 176 through a resistor 177.

Amplifiers 149, 173 and 176 are provided with an auxiliary power supply 178 shown in FIG. 4A which may consist of a resistor 179 connected in series with a pair of Zener diodes 181 and 182 between the cathode side of diode 77 and B− conductor 64 with the junction 183 between the two Zener diodes being connected to circuit ground.

The positive voltage from the junction between resistor 179 and Zener diode 181 is transmitted by a conductor 184 to the inverting input of operational amplifier 173 or FIG. 4B through a resistor 186 while an equal negative voltage is transmitted by a conductor 187 from B− conductor 64 to the positive input of operational amplifier 176 through a resistor 188. The inverting input of amplifier 176 is connected to circuit ground through a resistor 189 and both amplifiers 173 and 176 have stabilizing capacitors 191 connected between the outputs and inputs thereof.

The output of amplifier 173 is connected to the base of transistor 171 through a resistor 192 while the output of amplifier 176 is connected to the base of transistor 172 through a resistor 193. The gain of amplifier 173 is selected to bias transistor 171 into conduction when the output of amplifier 149 reaches a negative voltage level indicative of a predetermined degree of non-conformity between the steering wheel and vehicle articulation, while amplifier 176 biases transistor 172 into conduction when a positive output of the same magnitude is present at the output of amplifier 149. In this example, amplifiers 173 and 176 cause conduction through transistor 171 or 172, thereby blocking starting of the engine, if the output of amplifier 149 equals or exceeds plus or minus 0.3 volts which is characteristic of plus or minus 1.5° discrepancy between the steering wheel position and actual vehicle articulation.

When the above described safety start-up circuit operates to prevent engine start-up, the operator may readily correct the situation by turning the steering wheel while observing meter 159 to bring the meter indication to the zero or center position.

Considering now a highly advantageous feature of the present system that greatly enhances speed of response to turning of the steering wheel and increases precision with respect to matching the articulation motion of the vehicle to rotary motion of the steering wheel, reference should be made to FIG. 5. FIG. 5 illustrates certain major components of the system hereinbefore described in a schematic block form to emphasize feedback paths and phase relationships in the system as a whole.

In any articulated vehicle steering system which employs hydraulic cylinders 26 for the purpose of moving a substantial vehicle mass 11, a potential for adverse effects from oil mass resonance is present. As a practical matter, the oil or the like which drives the cylinders 26 exhibits some degree of compressibility both as a result of an inherent bulk modulus and a result of the elasticity of the hoses and the like which are employed to connect the cylinders with other components of the hydraulic circuit. In addition, there is an inherent positive feedback, represented by path 194 in FIG. 5, in a cylinder acting on a mass since movement of the mass as a result of fluid pressure in the cylinder acts to reduce such pressure. Given this regenerative feedback and the compressibility of the fluid, the cylinders 26 and vehicle mass 11 behave in a manner similar to a lightly damped spring-mass system and are capable of resonating at some particular frequency determined by the specific constants of the particular system. In one example of the present invention, this frequency is approximately 6.1 Hertz. While the feedback path 194 in actual fact is the same as the path through which the cylinder applies force to the vehicle mass, specifically the rods of the cylinders, it is represented as a separate loop 194 in FIG. 5 so that phase relationships may be indicated thereon. Starting at the point where the cylinder applies force to the vehicle mass 11, the phase lag is zero. The mechanical dynamics of the vehicle cause the velocity of articulation, indicated by the symbol $\dot{\psi}$ AA in FIG. 5, to lag the applied force by 90°. This is fed back to cylinder 26 negatively thereby adding another 180° phase lag so that the resulting feedback signal has a phase lag of minus 270°. The response of the cylinders 26 inherently adds still another 90° phase lag since the cylinders act as integrators, so that the phase lag of feedback at the point where the cylinders apply force to the vehicle is minus 360° which is equivalent to zero degrees. Thus, a signal passes around the closed loop under phase conditions which give rise to resonance. This oil mass resonance is characteristic of articulated vehicle steering systems employing hydraulic cylinders including prior systems in which the servo valve 48 is controlled by fluid or mechanical means.

This resonance can give rise to serious operating instabilities. In other words, the rate at which the vehicle articulates while the steering wheel is being turned is not precisely matched with the motion of the steering wheel itself but alternately lags and then exceeds the rate dictated by motion of the steering wheel. Essentially similar effects may occur when the steering wheel is not being turned if the system is disturbed by road shocks or other factors which generate a momentary force affecting the steady-state equilibrium. Given a momentary disturbance of the equilibrium, the vehicle oscillates about the articulation axis with resulting loss of precision in steering until the oscillation diminishes through damping. These effects can be reduced by reducing the system gain, however, this slows response of the system to turning of the steering wheel.

Figure 6A:
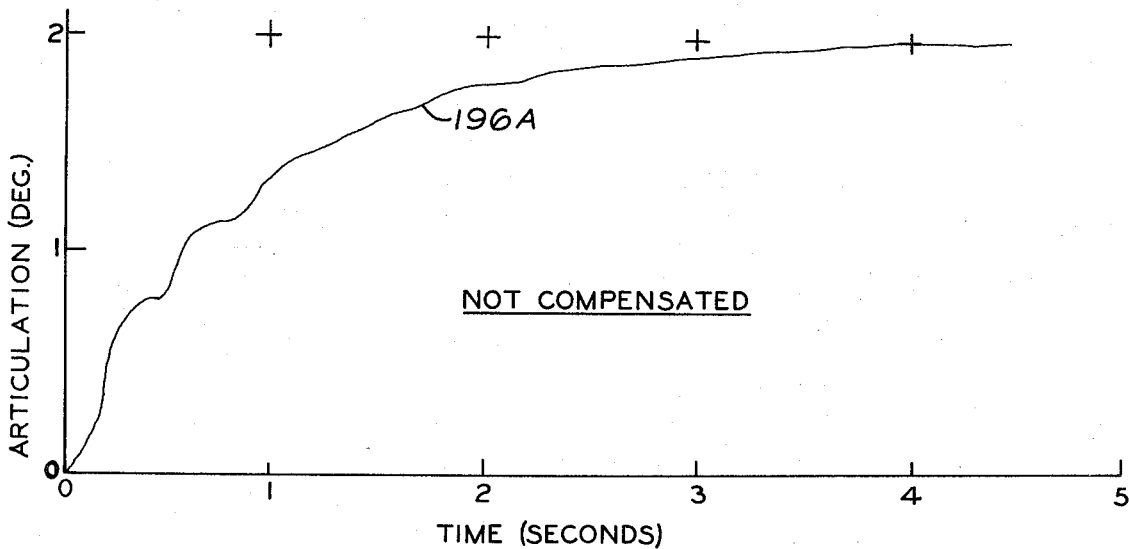
FIG. 6A is a graphical diagram illustrating the rate of response of the system of FIGS. 1 to 5 to a predetermined turning of the vehicle steering wheel in the absence of phase compensation for reducing oil mass resonance.

Curve 196A of FIG. 6A illustrates the actual progress of articulation of the vehicle during a two-degree turn of the steering wheel in a system as heretofore described but which lacks the compensating means 102 previously described in connecton with the operational amplifier 86 and wherein overall control loop gain has been reduced to achieve stability. It may be seen that the actual articulation of the vehicle does not proceed smoothly and requires about four seconds to reach approximate coincidence with the desired degree of turn. The undesirable second order oscillation of the system is readily evident. While the phenomenon has been tolerated in many prior vehicles, it is clearly undesirable and becomes a very serious hazard in very large vehicles or vehicles operated at high road speeds.

Attempts to counteract this phenomenon have heretofore involved the deliberate introduction of backlash into linkages, the introduction of energy absorbing friction devices to dampen oscillation or such measures as providing for a resitricted exchange of fluid between the ends of the hydraulic cylinders. These measures are not fully effective and are subject to various disadvantages such as dissipation of power or require unduly high fluid flow capacity.

The present invention avoids the problems discussed above by adjusting phase relationships in another feedback path 196 of the system to cause the combined feedback through both paths 194 and 196 to be degenerative and thereby inhibit oscillation.

Referring again to FIG. 5, it may be seen that the additional feedback path 196 is defined by the actual articulation signal potentiometer 37, summing operational amplifier 86, and control valve 48. In the absence of the phase compensation network 102, the feedback through this loop 196 arrives at the cylinders 26 with a phase lag of minus 360°, equivalent to 0°, and therefore does not significantly modify the previously described regenerative feedback through loop 194. In particular, again taking the point of coupling of cylinders 26 to vehicle mass 11 as having a zero phase lag, the actual articulation signal transmitted through potentiometer 37 has a phase lag of 180°. (This differs from the phase lag in the corresponding portion of loop 194 since in loop 194 the signal arises from articulation velocity but in loop 196 the signal arises from its integral, the actual articulation.) This feedback signal through potentiometer 37 is applied to the inverting input of the operational amplifier 86 and therefore the negative sign at the input adds another −180° to give a total phase lag in loop 196 of − 360°, i.e., 0° (Valve 48 does not introduce any significant phase shift.)

Figure 6B:
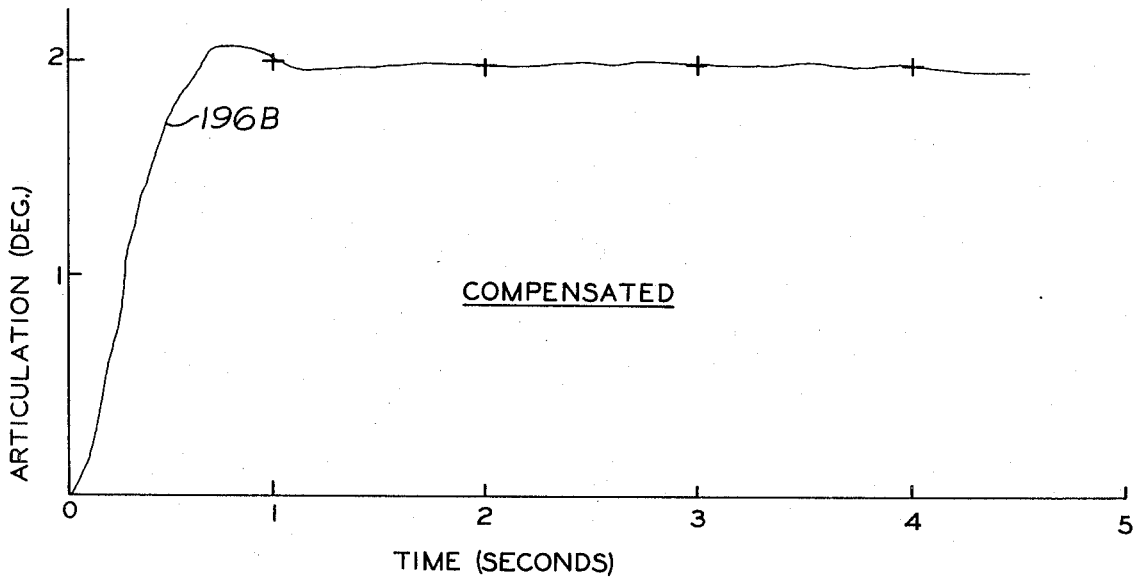
FIG. 6B is a graphical diagram illustrating rate of response of the system to the same turning of the steering wheel wherein phase compensation is provided.

The feedback compensating network 102, depicted in FIG. 5 by a block and in FIG. 4A by the capacitor 99 and resistor 98, introduces an additional 90° phase lag in loop 196. Within cylinders 26, this sums with the 270° phase lag through loop 194 whereby the net phase lag at the point of coupling between cylinders 26 and vehicle mass 11 is 180°. This is the necessary condition for negative or degenerative feedback which cancels out the inherent tendency of the system to resonate and allows the gain of loop 196 to be established at a high value to provide high accuracy and fast response. FIG. 6B graphically illustrates the actual response of the system under conditions similar to those of FIG. 6A but with the above described phase compensation present permitting the gain of the overall centrol loop to be high. Curve 196B illustrates the actual articulation of the vehicle with time following a 2° turn of the steering wheel. It may be seen that the vehicle articulates the desired 2° in less than one second and without substantial oscillation.

While the invention has been described with respect to a preferred embodiment, it will be apparent that modifications are possible and it is not intended to limit the invention except as defined in the following claims.

What is claimed is:

1. A steering system for a vehicle having an articulated body with front and rear body sections coupled together by pivot means providing for articulation of said vehicle about a vertical axis of said pivot means, comprising
  a source of pressurized fluid,
  at least one fluid motor coupled between said front and rear body sections of said vehicle for forcing articulation about said pivot axis,
  an electrically controlled valve means connected between said fluid source and said motor for actuating said motor to articulate said vehicle about said axis,
  a manually manipulatable operator's steering control,
  command signal generating means coupled to said operator's steering control for producing an electrical command signal indicative of movement of said steering control,
  actual articulation signal generating means coupled between said front and rear body sections of said vehicle for producing an electrical signal indicative of the actual articulation of said vehicle,
  circuit means connected between said command signal generating means and said valve means for causing said valve means to actuate said motor in response to movement of said operator's steering control and having,
  comparison circuit means connected between said command signal generating means and said actual articulation signal generating means and said electrically controlled means for transmitting an electrical actuating signal to said valve when said command signal differs from said actual articulation signal, and
  phase shifting means coupled to the feedback path defined by said actual articulation signal generating means and said comparison circuit means for establishing a predetermined phase lag therethough to inhibit fluid mass resonance effects in said steering system.

2. A vehicle steering system as defined in claim 1, wherein said operator's steering control is a rotatable steering wheel and wherein said command signal generating means is a first potentiometer having a movable contact coupled to said steering wheel and having means for producing an output voltage having a polarity indicative of the direction of movement of said steering wheel away from the centered position thereof and a magnitude indicative of the extent of said movement of said steering wheel sway from said centered position, and wherein said actual articulation signal generating means is a second potentiometer having a second movable contact mechanically coupled to one of said vehicle body sections and having means for producing an output voltage which has a polarity indicative of the direction of articulation of said vehicle and which has a magnitude indicative of the extent of said articulation of said vehicle, the polarity of said output voltage of said second potentiometer being opposite from the polarity of said output voltage of said first potentiometer, and wherein said comparison circuit means comprises an amplifier having input means receiving said first and second potentiometer output signals whereby said output signals cancel at said amplifier input means when the position of said steering wheel corresponds to the actual articulation of said vehicle and wherein said amplifier produces an output signal when the position of said steering wheel and the actual articulation of said vehicle are out of conformity, the amplifier output signal having a polarity and magnitude indicative of the direction and extent of such disconformity, means for transmitting said amplifier output to said valve for actuating said valve to conform the articulation of said vehicle with the position of said steering wheel, and wherein said phase shifting means is a resistance-capacitance network means connected between the input and output of said amplifier.

3. A vehicle steering system as defined in claim 2 wherein said phase shifting means comprises means establishing a substantially 90° phase lag in said electrical actuating signal transmitted from said comparison circuit means to said electrically controlled valve means.

4. A steering system for a vehicle having an articulated body with front and rear body sections coupled together by pivot means providing for articulation of said vehicle about a vertical axis of said pivot means, wherein said vehicle has an engine and starter means for cranking said engine, comprising:

a source of pressurized fluid, at least one fluid motor coupled between said front and rear body sections of said vehicle for forcing articulation about said pivot axis, an electrically controlled valve means connected between said fluid source and said motor for actuating said motor to articulate said vehicle about said axis, a manually manipulatable operator's steering control, command signal generating means coupled to said operator's steering control for producing an electrical command signal indicative of movement of said steering control, circuit means connected between said command signal generating means and said valve means for causing said valve means to actuate said motor in response to movement of said operator's steering control, means producing an error signal indicative of a predetermined amount of difference in the position of said operator's steering control and the actual articulation of said vehicle, and means receiving said error signal for blocking operation of said engine starter means when said error signal indicates said difference is at least equal to said predetermined amount.

5. A vehicle steering system as defined in claim 4 wherein said error signal has a magnitude indicative of the amount of said difference and an electrical polarity indicating the angular direction of said difference, further comprising an indicator means receiving said error signal for informing said operator of said amount and direction of said difference.

6. A vehicle steering system as defined in claim 4 wherein said engine starter means is electrically actuated through a set of electrical contacts and wherein said error signal producing means produces said error signal in the form of an output voltage having a polarity indicative of the direction of the difference in the position of said steering control and the actual articulation of said vehicle and having a magnitude indicative of the extent of said difference, further comprising
an electrically controlled means for operating said contacts,
a first amplifier connected between said error signal producing means and said contact operating means and actuating said contact operating means to open said contacts in response to a positive output voltage from said error signal generating means of a predetermined magnitude, and
a second amplifier connected between said error signal generating means and said contact operating means and actuating said contact operating means to open said contacts in response to a negative output voltage from said error signal generating means of a predetermined magnitude.

7. A steering system for an articulated vehicle having forward and rear body sections pivoted together to provide for articulation of said vehicle about a substantially vertical axis, comprising
at least one hydraulic cylinder connected between said front and rear body sections for articulating said vehicle about said axis in either direction in response to fluid flow supplied to said cylinder,
a source of pressurized hydraulic fluid carried on said vehicle,
an electrically controlled valve means connected between said source of fluid and said cylinder and having a centered position at which fluid flow to said cylinder is blocked and a right turn position at which fluid is directed to one end of said cylinder while being released from the other end thereof and a left turn position at which fluid is directed to said other end of cylinder while being released from said one end thereof, said valve means having electrical control means with an input conductor wherein an input voltage of first polarity shifts said valve to said right turn position in an amount proportional to the magnitude of said voltage and an input voltage of opposite polarity shifts said valve to said left turn position in an amount proportional to the magnitude of said voltage,
a steering wheel mounted on said vehicle for manipulation by the operator thereof,
a source of DC electrical current of predetermined voltage,
a command signal generating potentiometer having a resistive element connected across said power source and having a movable contact coupled to said steering wheel for operation thereby and having a center tapped ground connection whereby turning of said steering wheel away from the centered position thereof produces a command signal output voltage which has a first polarity relative to said ground and a magnitude indicative of the extent of said turning and turning of said steering wheel in the opposite direction from said second position produces a command signal output voltage having an opposite polarity and having a magnitude indicative of the extent of said opposite turning of said wheel, an actual articulation signal generating potentiometer secured to one of said body sections and having a resistive element connected across said power supply and having a center tap to said ground connection and having a movable contact coupled to the other of said body sections whereby articulation of said vehicle in one direction produces an actual articulation signal output voltage having a polarity opposite to the polarity of said first potentiometer and having a magnitude indicative of said actual articulation of said vehicle and whereby articulation of said vehicle in the opposite direction produces an actual articulation signal output voltage having a reversed polarity and a magnitude indicative of the extent of said opposite articulation, a summing amplifier having an output coupled to said input conductor of said electrically controlled valve means and having an input coupled to said movable contacts of said first potentiometer and second potentiometer whereby said amplifier receives an input voltage which is a summation of said output voltages of said potentiometers and is therefore zero when said steering wheel position corresponds to the actual articulation of said vehicle and which otherwise has a polarity indicative of the direction of disconformity of said steering wheel with said actual articulation and a magnitude indicative of the extent of said disconformity causing said amplifier to transmit an output voltage to said electrically controlled valve means to maintain said actual articulation of said vehicle in substantial conformity with the position of said steering wheel, and a feedback circuit coupled to said output of said amplifier and to said input thereof, said feedback circuit having means for introducing a predetermined phase lag into the signal path between said amplifier input and said input conductor of said electrically controlled valve means to counteract fluid mass resonance effects in said steering system.

* * * * *